(12) United States Patent
Winowiecki

(10) Patent No.: US 10,941,287 B1
(45) Date of Patent: Mar. 9, 2021

(54) LOW-GLOSS THERMOPLASTIC COMPOSITION

(71) Applicant: Innovative Polymers, LLC, Kalamazoo, MI (US)

(72) Inventor: Kris W. Winowiecki, Kalamazoo, MI (US)

(73) Assignee: Innovative Polymers, LLC, Kalamazoo, MI (US)

( * ) Notice: Subject to any disclaimer, the term of this patent is extended or adjusted under 35 U.S.C. 154(b) by 0 days.

(21) Appl. No.: 16/601,695

(22) Filed: Oct. 15, 2019

(51) Int. Cl.
    C08L 23/12     (2006.01)
    C08L 23/16     (2006.01)
    C08L 23/18     (2006.01)
    C08K 3/36      (2006.01)

(52) U.S. Cl.
    CPC .............. *C08L 23/12* (2013.01); *C08L 23/16* (2013.01); *C08L 2205/03* (2013.01)

(58) Field of Classification Search
    CPC ...... C08L 23/12; C08L 23/16; C08L 23/0815; C08L 23/18; C08L 23/20; C08L 2005/03
    See application file for complete search history.

(56) References Cited

U.S. PATENT DOCUMENTS

| | | | |
|---|---|---|---|
| 5,451,642 A | 9/1995 | Abe et al. | |
| 5,994,442 A | 11/1999 | Fujiguchi et al. | |
| 6,384,137 B1 * | 5/2002 | Mizutani et al. | C08L 53/00 525/88 |
| 7,649,057 B2 | 1/2010 | DeRudder et al. | |
| 8,222,351 B2 | 7/2012 | DeRudder | |
| 8,648,148 B2 | 2/2014 | Shields et al. | |
| 9,006,380 B2 | 4/2015 | Weaver et al. | |
| 9,862,825 B2 | 1/2018 | Kasazaki et al. | |
| 10,308,797 B2 | 6/2019 | Lummerstorfer et al. | |
| 2005/0267261 A1 * | 12/2005 | Plaver | C08F 8/00 525/191 |
| 2007/0135570 A1 | 6/2007 | Krishnamurthy et al. | |
| 2018/0133559 A1 | 5/2018 | Sullivan | |
| 2019/0125029 A1 | 5/2019 | Edwards | |

FOREIGN PATENT DOCUMENTS

CN 103665540 A * 3/2014 .............. B29C 48/92

OTHER PUBLICATIONS

Computer-generated English-language translation of CN-103665540-A.*
Google search history (Oct. 29, 2020).*

* cited by examiner

Primary Examiner — Vu A Nguyen
(74) Attorney, Agent, or Firm — Gunther J. Evanina; Butzel Long, PC

(57) ABSTRACT

A composition for extruding or injection molding low-gloss articles exhibiting improved color retention and mechanical properties as compared with conventional pigmented or painted PVC or TPO resins includes polypropylene, a thermoplastic polyolefin elastomer in an amount sufficient to impart superior impact resistance, at least one particulate delustering agent in an amount sufficient to provide low-gloss without sacrificing impact strength, and at least one dye or pigment in an amount sufficient to impart a desired color.

20 Claims, 3 Drawing Sheets large volumes of
delustering agents can adversely affect impact strength.
LOW-GLOSS THERMOPLASTIC COMPOSITION

CROSS-REFERENCE TO RELATED APPLICATIONS

Not Applicable.

FIELD OF THE DISCLOSURE

Disclosed are low-gloss thermoplastic compositions exhibiting an excellent combination of strength and weatherability.

BACKGROUND OF THE DISCLOSURE

Low-gloss thermoplastic surfaces can often provide favorable aesthetics in particular outdoor applications, such as fence posts, rails and balusters; decking, window frames, and door frames. Such products are typically extruded and require either mechanically delustering the surface or adding large volumes of delustering agents, such as silica, silicates, alumina or the like. Mechanical delustering involves an added step that increases cost. Adding large volumes of delustering agents can adversely affect impact strength.

Another problem with conventional low-gloss thermoplastic articles is that they tend to rapidly lose color (i.e., fade) when exposed to sunlight and precipitation. This problem has been overcome by painting the exposed surfaces of the articles. However, this adds significantly to the cost of the product and often requires restoration (touch ups) after installation to cover any underlying surfaces exposed by chipping, flaking or peeling of paint from the surface.

SUMMARY OF THE DISCLOSURE

There is disclosed a thermoplastic composition that can be extruded or molded to provide articles exhibiting an excellent combination of weatherability, mechanical properties and low-gloss. The composition comprises about 5% to about 90% polypropylene by weight, about 5% to about 55% of at least one thermoplastic polyolefin elastomer by weight, about 0.1% to about 10% polybutylene by weight, about 0.2% to about 25% of at least one particulate delustering agent by weight, and about 0.5% to about 4% of a pigment or dye by weight, wherein the polypropylene, thermoplastic polyolefin elastomer, polybutylene, particulate delustering agent and pigment comprise at least 90% of the weight of the composition.

DESCRIPTION OF THE PREFERRED EMBODIMENTS

Figure 1:
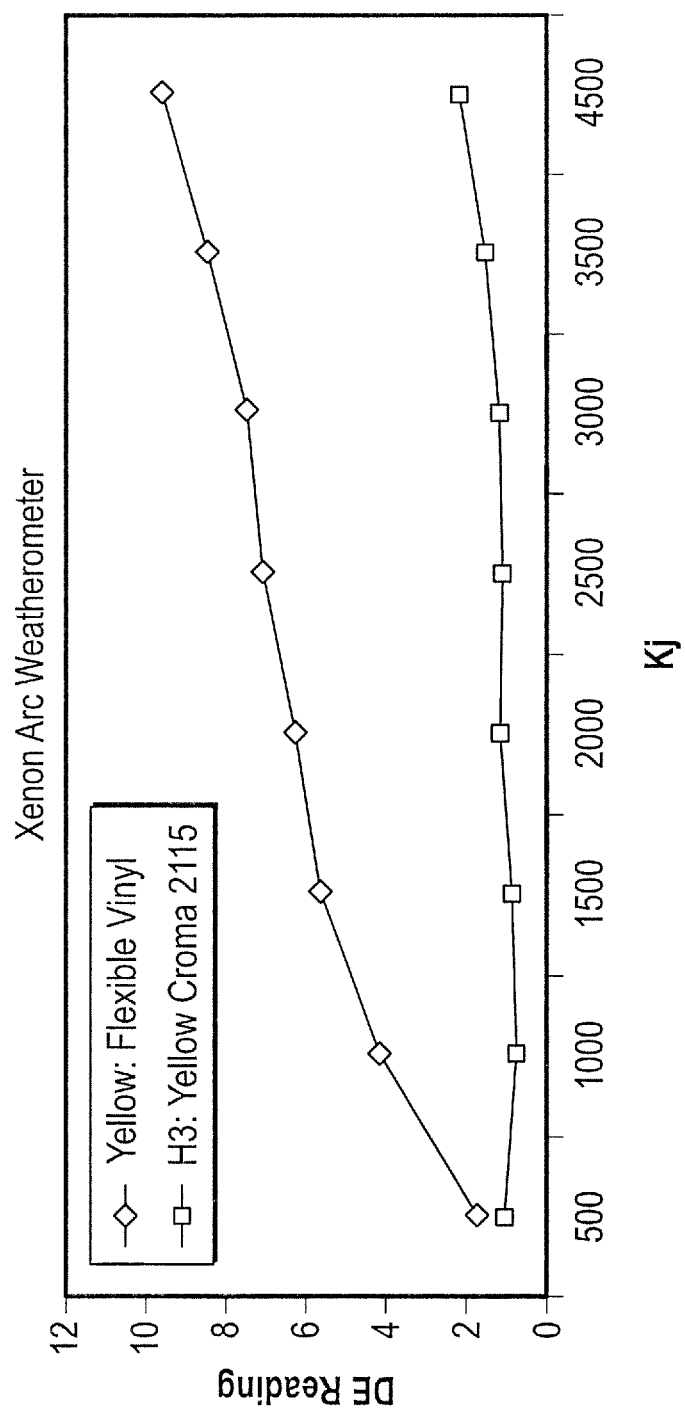
FIG. 1 is a graphical illustration of color retention as a function of Xenon arc lamp radiation exposure for a yellow plastic article in accordance with this disclosure compared with a yellow PVC article.

The low-gloss thermoplastic compositions of this disclosure include polypropylene in an amount sufficient to provide an excellent combination of scratch resistance and heat deflection temperature (e.g., greater than 200° F.), at least one thermoplastic polyolefin rubber (elastomer) in an amount sufficient to impart excellent impact resistance without significantly reducing scratch resistance, polybutylene in an amount that enhances deglossing and impact resistance, at least one particulate delustering agent in an amount sufficient to provide an aesthetically desired low-gloss surface without adversely affecting impact strength, and at least one dye or pigment in an amount sufficient to impart a desired color (i.e., hue, tint, tone and shade).

The polypropylene can be a homopolymer of propylene, a copolymer of propylene and ethylene, or a copolymer of propylene and an alpha-olefin co-monomer. The polypropylene copolymer, when used, may be comprised of greater than 95% propylene-derived units, more preferably greater than 98% propylene-derived units, and most preferably greater than 99% propylene-derived units. The preferred polypropylenes have a crystallinity of at least 50%, more preferably at least 80% and most preferably greater than 90%, as determined by differential scanning colorimetry.

The low-gloss thermoplastic compositions of this disclosure may comprise from about 5% polypropylene to about 90% polypropylene by weight. Preferably, the composition comprises at least 40% polypropylene by weight. It is believed that heat deflection temperature and scratch resistance are somewhat compromised when the composition comprises less than 40% polypropylene. Preferably, the composition comprises about 80% or less polypropylene by weight, primarily to allow for sufficient synthetic elastomer (or rubber) to impart excellent impact resistance, and sufficient particulate delustering agent to achieve a desired low-gloss. A preferred amount of polypropylene is 10% to 80% of the composition by weight, and more preferably 40% to 80% by weight of the composition.

Suitable elastomers are saturated (non-curable or non-vulcanizable) rubbers that are compatible with polypropylene, such that the blend exhibits macroscopically uniform physical properties. Preferred elastomers include ethylene-propylene rubber (EPM) and ethylene-propylene-diene rubber (EPDM). Other thermoplastic elastomers that can be used include ethylene/alpha-olefin copolymers obtained by polymerization of ethylene with an alpha-olefin having 3 to 12 carbon atoms (e.g., butane, 1-hexene, 1-methylpentane, 1-heptene, 1-octene, 1-nonene, 1-decene, 1-undecene and 1-dodecene). Combinations of thermoplastic polyolefin elastomers can be used. For example, a combination of EPDM rubber and an ethylene/alpha-olefin copolymer can be used.

Polybutylene is added to the low-gloss thermoplastic compositions of this disclosure in an amount that enhances deglossing and impact resistance without sacrificing other desired properties. This amount can be as little as about 0.1% by weight and as high as about 10% by weight, with a preferred range being from about 0.5% to about 10% or from about 1% to about 10%.

Examples of particulate delustering agents that can be used in the disclosed low-gloss thermoplastic compositions include fumed silica, talc, mica, calcium carbonate, calcium oxide, calcium hydroxide, magnesium oxide, magnesium sulfate, aluminum hydroxide, barium sulfate, glass microparticles, clay, dolomite and alumina. The delustering agent is typically in the form of a fine particulate having a size distribution in the micrometer or nanometer ranges (e.g., 100 nm to 100 µm). It has been determined that low gloss can be achieved using lower amounts of particulate delustering agent(s) by using fumed silica, either alone or in combination with at least one other particulate delustering agent. In addition to reducing gloss, particulate delustering agents can have the added benefit of reducing cost and/or increasing flexural modulus. However, higher amounts of particulate delustering agents can cause reduced impact strength and/or reduced tensile strength.

The total amount of particulate delustering agents that is acceptable typically is in the range of from about 0.2% to about 25% of the weight of the composition, preferably from about 1% to about 20%, and most preferably from about 5% to about 10%. It is also desirable that at least one of the particulate delustering agents is fumed silica (e.g., Aerosil® fumed silica from Evonik Industries) present in an amount of from about 0.1% to about 5% by weight of the composition, more preferably from about 1% to about 4%.

The low-gloss thermoplastic compositions of this disclosure are intended to be used in articles having an exposed or displayed surface exhibiting desirable appearance that is maintained after prolonged weathering. In particular, the compositions are formulated to maintain low-gloss and retain color after prolonged exposure to sunlight and precipitation without reliance on a surface coating (e.g., paint or clear coating). As such, the compositions disclosed herein contain from about 0.5% to about 4% of at least one dye or pigment, more preferably from 1% to 2%, by weight of the composition. Examples of pigments that can be used individually or in coordination include titanium dioxide, carbon black, red iron oxide, black iron oxide, chromium oxide green and ultramarine blue. Examples of dyes include azo red dyes, quinacridone red dyes, anthraquinone red dyes, perylene red dyes, copper phthalocyanine blue and green dyes, isoindolineone orange and yellow dyes, and carbazole violet dyes.

The low-gloss thermoplastic compositions disclosed herein can, and preferably do, include a nucleating agent that increases the rate of crystallization of polypropylene from a melted blend, such as during extrusion or injection molding. Suitable nucleating agents include solid bicyclic dicarboxylic acid salts, such as bicyclo [2.2.1] heptane-2-carboxylic acid salt. A suitable amount of nucleating agent (e.g., a solid bicyclic dicarboxylate) is from about 0.1% to about 0.5% of the composition by weight.

The compositions of this disclosure may contain other component polymers or additives, such as flame retardants, lubricants, plasticizers, and weatherability enhancing agents in relatively modest and conventional amounts. However, the amount of polypropylene, thermoplastic polyolefin elastomer, polybutylene particulate delustering agent(s), and pigment(s) and/or dye(s) comprise at least 90% of the weight of the disclosed compositions, preferably at least 95%, and most preferably at least 98%.

The compositions of this disclosure can be used for producing various articles by injection molding or extrusion. Applications include decking, fence posts and rails, window frames, door frames, architectural molding, and automotive parts that require a low-gloss appearance, such as simulated wood trim, door handles, satin-nickel chrome accent trim and appliques. In certain applications, the compositions disclosed herein can be co-extruded with a different base resin composition to produce a laminate, or extruded or molded onto a preexisting solid substrate (e.g., aluminum or steel substrate).

The low-gloss thermoplastic compositions of this disclosure offer several advantages over the polyvinyl chloride (PVC) articles typically used for outdoor applications. These include lower density (approximately 40% lower than PVC compositions), superior weathering, superior impact resistance, superior scratch resistance, reduced cost, and higher heat deflection temperature (i.e., greater than 200° F. or 230° F., as compared with 161° F. for PVC).

Figure 2:
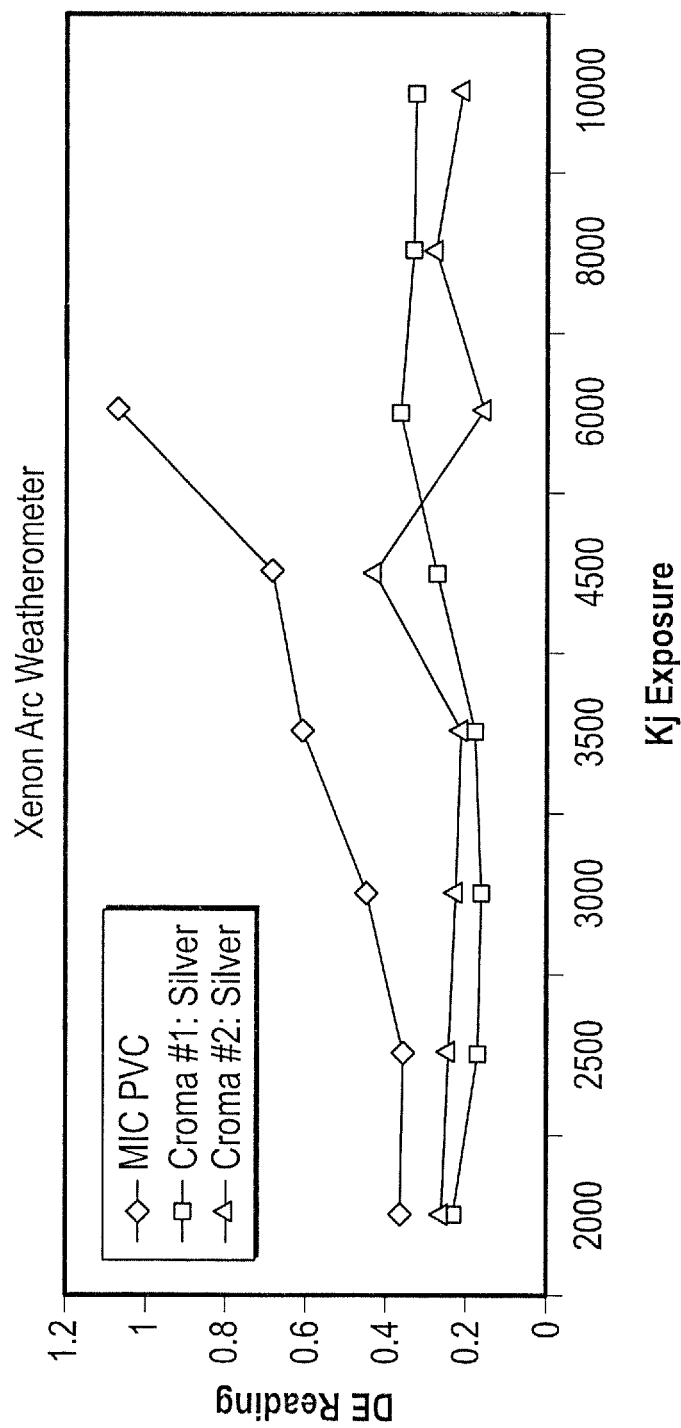
FIG. 2 is a graphical illustration of color retention as a function of Xenon arc lamp radiation exposure for two silver plastic articles in accordance with this disclosure compared with a silver PVC article.

Comparative Xenon Arc Weatherometer testing of identically configured samples in accordance with this disclosure and painted TPO articles showed that the compositions, disclosed herein provide products exhibiting superior color retention. FIG. 1 illustrates the change in color (DE Reading) as a function of cumulative exposure to electromagnetic energy from a Xenon arc lamp for yellow colored plastic articles. A DE Reading less than 3.0 at 2500 Kj is considered acceptable (i.e., a passing grade). Comparative Xenon Arc Weatherometer testing was also performed on silver colored plastic articles. The results for the silver parts are shown in FIG. 2. The results show that the yellow articles in accordance with this disclosure (Croma 2115) exhibited excellent color retention, whereas the yellow PVC articles failed. The silver plastic article in accordance with this disclosure (Croma #1 and Croma #2) also exhibited superior color retention (i.e., low DE Reading) as compared with the silver PVC article.

The silver-colored plastic articles in accordance with this disclosure were also tested for color retention under natural (free) weathering conditions in Florida and Arizona for 2 years, with the resulting DE Reading being 0.80 in Florida and 0.29 in Arizona after the 2 year period. Even after 3 years of natural weathering in Florida, the silver articles in accordance with this disclosure has a DE Reading of 0.76.

Figure 3:
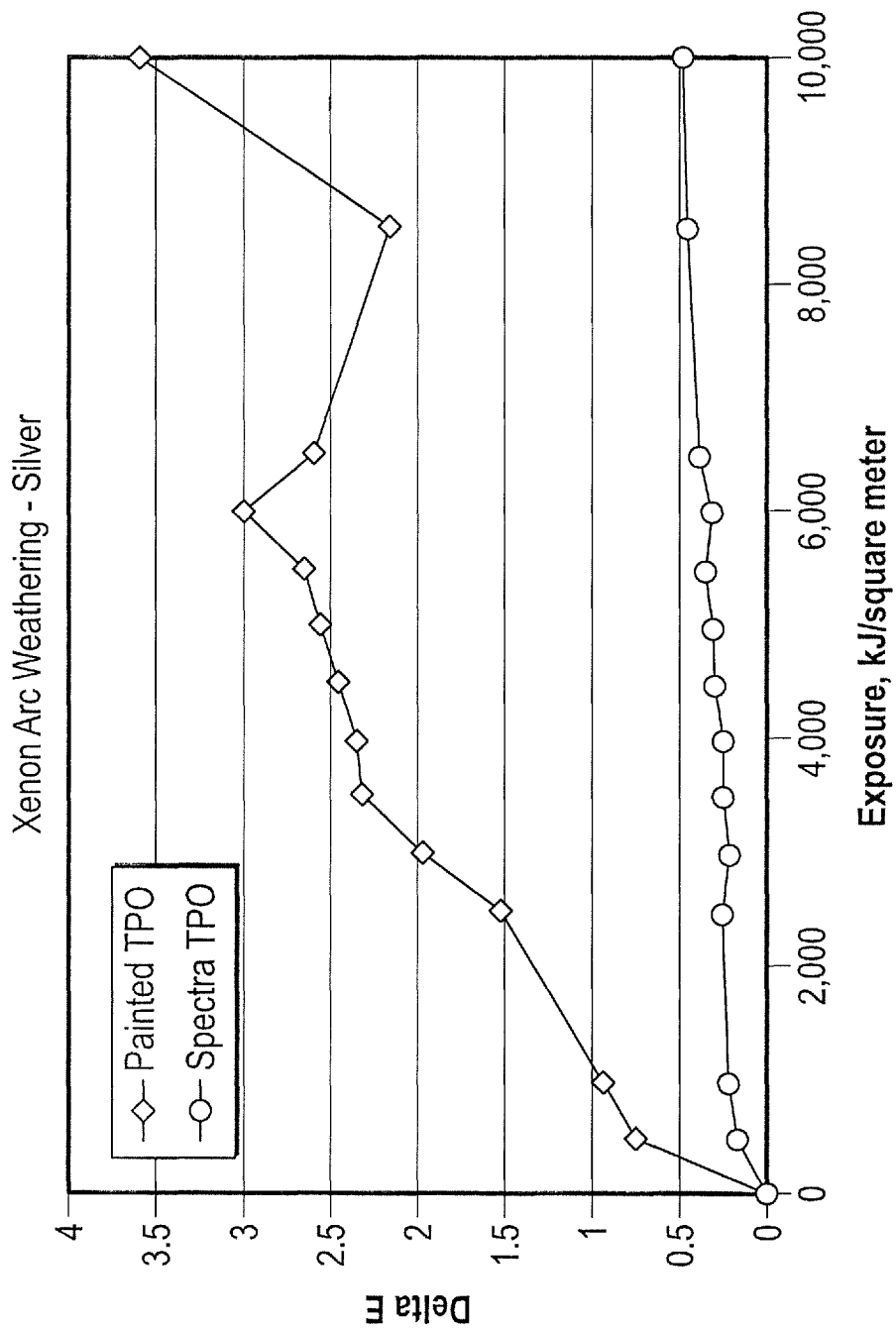
FIG. 3 is a graphical illustration of color retention as a function of Xenon arc lamp radiation exposure for a silver plastic article in accordance with this disclosure compared with a silver painted commercially available thermoplastic olefin.

A silver pigmented article in accordance with this disclosure was subjected to comparative testing with a silver painted commercially available thermoplastic olefin extrudate (TPO) using a Xenon Arc Weatherometer. The results illustrated in FIG. 3 show that the silver articles of this disclosure (Spectra TPO) exhibit substantially superior color retention (Delta E or DE Reading) as compared with the conventional silver painted TPO articles (Painted TPO).

Comparative testing also showed that identically configured (i.e., sized and shaped) extrudes in accordance with this disclosure had lower density (0.92 g/cm$^3$) than the PVC articles (1.35 g/cm$^3$), a lower coefficient of liner thermal expansion (8.5-9.5) than the PVC articles (14.5), which also exhibits a substantially superior Gardner Impact strength at 23° C. (320 in-lbs) as compared with 40 in-lbs for the PVC articles. Comparative testing also indicates that the articles of this disclosure exhibited substantially better Gardner Impact at 23° C. (320 in-lbs) that conventional painted thermoplastic olefin extrudes (160 in-lbs). Scratch resistance for the articles in accordance with this disclosure was found to be comparable to that of PVC and conventional thermoplastic olefin articles.

Excellent color retention was exhibited for a variety of different colored articles in accordance with this disclosure, including black, silver, redwood and cedar, all of which had Xenon Arc Weatherometer DE Readings of 0.83 or less at 2500 Kj.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. A low-gloss thermoplastic composition comprising:
   polypropylene in an amount of from 5% to 90% by weight;
   at least one thermoplastic polyolefin elastomer in an amount from 5% to 55% by weight;
   polybutylene in an amount of from 0.1% to 10% by weight;
   at least one particulate delustering agent in an amount of from 0.2% to 25% by weight; and
   at least one dye or pigment in an amount of from 0.5% to 4% by weight;
   wherein the polypropylene, thermoplastic polyolefin elastomer, polybutylene, particulate delustering agent and pigment comprise at least 90% of the weight of the composition.

2. The composition of claim 1, wherein the polypropylene is a homopolymer.

3. The composition of claim 1, wherein the polypropylene has a crystallinity of at least 50%.

4. The composition of claim 1, wherein the polypropylene is present in an amount of from 10% to 80% by weight.

5. The composition of claim 1, wherein the polypropylene is present in an amount of from 40% to 80% by weight.

6. The composition of claim 1, wherein the thermoplastic polyolefin elastomer comprises EPM.

7. The composition of claim 1, wherein the thermoplastic polyolefin elastomer comprises EPDM.

8. The composition of claim 1, wherein the thermoplastic polyolefin elastomer comprises ethylene/alpha-olefin copolymer.

9. The composition of claim 1, wherein the at least one thermoplastic elastomer comprises from 10% to 25% of the composition by weight.

10. The composition of claim 1, wherein polybutylene is present in an amount of from 1% to 10% by weight.

11. The composition of claim 1, wherein the at least one particulate delustering agent includes fumed silica in an amount of from 1% to 4% of the composition by weight.

12. The composition of claim 11, wherein the at least one particulate delustering agent includes a delustering agent other than fumed silica.

13. The composition of claim 12, wherein the delustering agent other than fumed silica is selected from talc, mica, calcium carbonate, calcium oxide, calcium hydroxide, barium sulfate, glass microparticles, clay, dolomite and alumina.

14. The composition of claim 1, wherein the at least one delustering agent has particle sizes distributed in the range from 100 nm to 100 μm.

15. The composition of claim 1, wherein the at least one delustering agent is present in amounts of from 5% to 10% by weight.

16. The composition of claim 1, further comprising a nucleating agent that promotes polypropylene crystallization.

17. The composition of claim 16, wherein the nucleating agent is a solid bicyclic dicarboxylate present in an amount of from 0.1% to 0.5% by weight.

18. The composition of claim 1, wherein the polypropylene, thermoplastic polyolefin elastomer, polybutylene, particulate delustering agent and pigment comprise at least 95% of the weight of the composition.

19. The composition of claim 1 shaped into an article by extrusion.

20. The composition of claim 1, shaped into an article by injection molding.

\* \* \* \* \*